United States Patent [19]

Slezak et al.

[11] Patent Number: 4,875,117
[45] Date of Patent: Oct. 17, 1989

[54] DIGITAL HEAD POSITIONER ASSEMBLY

[75] Inventors: Arnold Slezak, Newbury Park; Lloyd Levy, Northridge, both of Calif.

[73] Assignee: Micropolis Corporation, Chatsworth, Calif.

[21] Appl. No.: 291,695

[22] Filed: Dec. 29, 1988

Related U.S. Application Data

[63] Continuation-in-part of Ser. No. 113,614, Oct. 26, 1987, Pat. No. 4,796,122, which is a continuation-in-part of Ser. No. 944,466, Dec. 19, 1986, Pat. No. 4,754,353.

[51] Int. Cl.[4] .................... G11B 5/55; G11B 17/02; G11B 21/08
[52] U.S. Cl. ............................ 360/98.01; 360/104; 360/106
[58] Field of Search ............... 360/104, 106, 98.01; 29/603

[56] References Cited

U.S. PATENT DOCUMENTS

| | | | |
|---|---|---|---|
| 3,864,750 | 2/1975 | Applequist | 360/98 |
| 4,331,991 | 5/1982 | Morehouse et al. | 360/106 |
| 4,391,035 | 7/1983 | Van de Bult | 29/603 |

*Primary Examiner*—Robert S. Tupper
*Attorney, Agent, or Firm*—Poms, Smith, Lande & Rose

[57] ABSTRACT

The head positioner for a Winchester type hard disk drive digital storage system includes a main rotating metal body portion having outwardly extending, integral, head positioning arms. The magnetic heads for reading and writing information on the hard disks are mounted on springy members which are referred to as "load beams". In order to reduce vibration, and to increase the accuracy of positioning of the heads on the disks, the outwardly extending arms from the main metallic body of the head positioner unit extend outwardly from the central axis of rotation for a distance which is substantially greater than the additional outward extent of the spring load beams upon which the magnetic heads are supported. Preferably the outward extent of the rigid arms is in the order of twice the length of the springy load beams. In addition, the bearings for supporting the rotating head positioning assembly are preferably mounted directly to the metallic body of the head positioner assembly. The springy load beams which support the magnetic heads may be secured to the ends of the outwardly extending arms by the placement of preformed exterior filler metal buttons over the holes in the ends of said load beams which join with said integral arms' tapered ends whereby a means for generating a solid phase metallurgical bond generates a solid phase metallurgical bond between said buttons and said integral arms thereby securing said load beams and the associated magnetic heads to said integral arms.

19 Claims, 5 Drawing Sheets

FIG. 7

DIGITAL HEAD POSITIONER ASSEMBLY

RELATED PATENT APPLICATION

This patent application is a continuation-in-part of U.S. patent application Ser. No. 113,614, filed Oct. 26, 1987, which is now U.S. Pat. No. 4,796,122, which in turn is a continuation-in-part of U.S. patent application Ser. No. 944,466, filed Dec. 19, 1986, which is now U.S. Pat. No. 4,754,353, issued June 28, 1988.

BACKGROUND OF THE INVENTION

In the field of storage systems using hard magnetic disks, also known as Winchester drives, the density of storage of data on the disks has reached a relatively high level. Thus, for example, in the field of 5¼ inch diameter disk drives, each disk may have somewhat more than one thousand tracks, and each track may contain more than 20,000 bytes of information, with each byte including 8 binary digits or bits of information. Thus, each side of a 5¼ inch hard disk is capable of carrying in the order of one million bits of information; and the density of storage of information will no doubt increase, as it has in the past.

With this very high density of data storage, it is important that the magnetic heads by which information is written on the disks and is read therefrom, be very accurately positioned, and that the heads are not subject to significant vibration or undesired shifting in their position as a result of mechanical linkages, or thermal or mechanical cycling. Up to the present time, head positioners have usually been formed with a central rotating member, and with a plurality of rigid mounting arms being mechanically secured to the central head positioning member by screws or the like, as shown in U.S. Pat. No. 4,544,972, for example. The magnetic heads for reading and writing information on the hard disks, are then secured to the outwardly extending arms, by springy load beams, having sufficient resilience so that as the disks rotate at high speed, the magnetic heads "fly" at a height of a few millionths of an inch over the disk surface. However, the separate mechanical linkage between the spring load beams which support the head, and the central head positioner body, introduces the possibility of vibration and loosening, so that the accuracy of positioning of the heads is severely limited.

Accordingly, one of the principal objects of the invention disclosed in U.S. Pat. No. 4,796,122 noted above, was to provide an improved magnetic head mounting arrangement with greater accuracy, consistency in the positioning of magnetic heads despite vibration, thermocycling and the like. A principal objective of the present invention is to reduce the time, cost and effort of securing said load beams and associated magnetic head to the extending positioning arms, while improving the vibration and thermal cycling resistance of the mechanical linkage and the spring loads beams which support the head.

Accordingly, a principal object of the present invention is to provide an improved magnetic head mounting arrangement with greater accuracy and consistency in the positioning of the magnetic heads, despite vibration, thermal cycling, and the like with greater efficiency.

SUMMARY OF THE INVENTION

In accordance with the present invention, the foregoing object is achieved through the use of a main rotatable head positioning metal body having integral outwardly extending arms which connect directly to the springy load beams which support the magnetic heads, with the outward extent of the integral arms being substantially greater than the length of the springy load beams.

In accordance with another feature of the invention, the outer ends of the integral arms from the main head positioner body are provided with holes, as are the inner ends of the spring load beams, and a small plate with an outwardly extending tublet is welded to the spring load beams with the tublet extending through the opening in the load beam, and the tublet is swaged into place within the hole at the outer end of each arm. Normally, two spring load beams are secured to each arm, with one being located on each side of each arm, and a stack of as many as nine arms may be employed to mount heads to cooperate with both sides of eight hard disks.

In accordance with an additional aspect of the invention, a central fixed shaft assembly may be rigidly secured to the housing of the hard disk drive, and the main metallic body of the rotating head positioner may have a central opening directly engaging bearings which are mounted on the fixed central shaft or shaft assembly, to minimize the possibility of vibration or thermal factors shifting the position of the heads relative to the storage disks which are separately mounted to the hard disk drive housing.

With the main rotatable head positioning metal body directly engaging the mounting bearings, and having integral arms extending outwardly to directly and firmly support the spring load beams carrying the magnetic heads, the magnetic heads are much more accurately positioned, and are free from vibration and other adverse factors affecting head position, which could result from prior, less solid, non-integral constructions.

The magnetic heads are much more accurately positioned due to the fact of the use of a solid state metallurgical bonding technique to secure said load beams to said extending arms and not a mechanical interference joint susceptible to the loosening of the mechanical fit due to vibrational cycling.

In accordance with additional aspects of the invention, an exterior filler metal button is utilized to secure the load beams to the integral arms through the creation of a metallurgical bond between the filler metal button and the integral arms.

Other objects, features, and advantages of the invention will become apparent from a consideration of the following detailed description and from the accompanying drawings.

DETAILED DESCRIPTION

Figure 1:
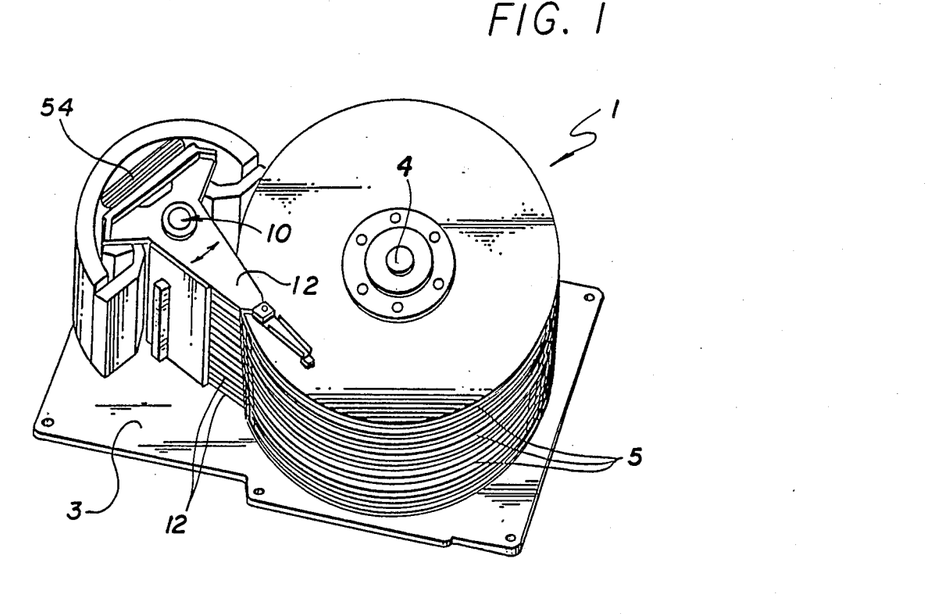
FIG. 1 is a perspective view of a Winchester or hard disk drive with the upper cover removed.
Figure 2:
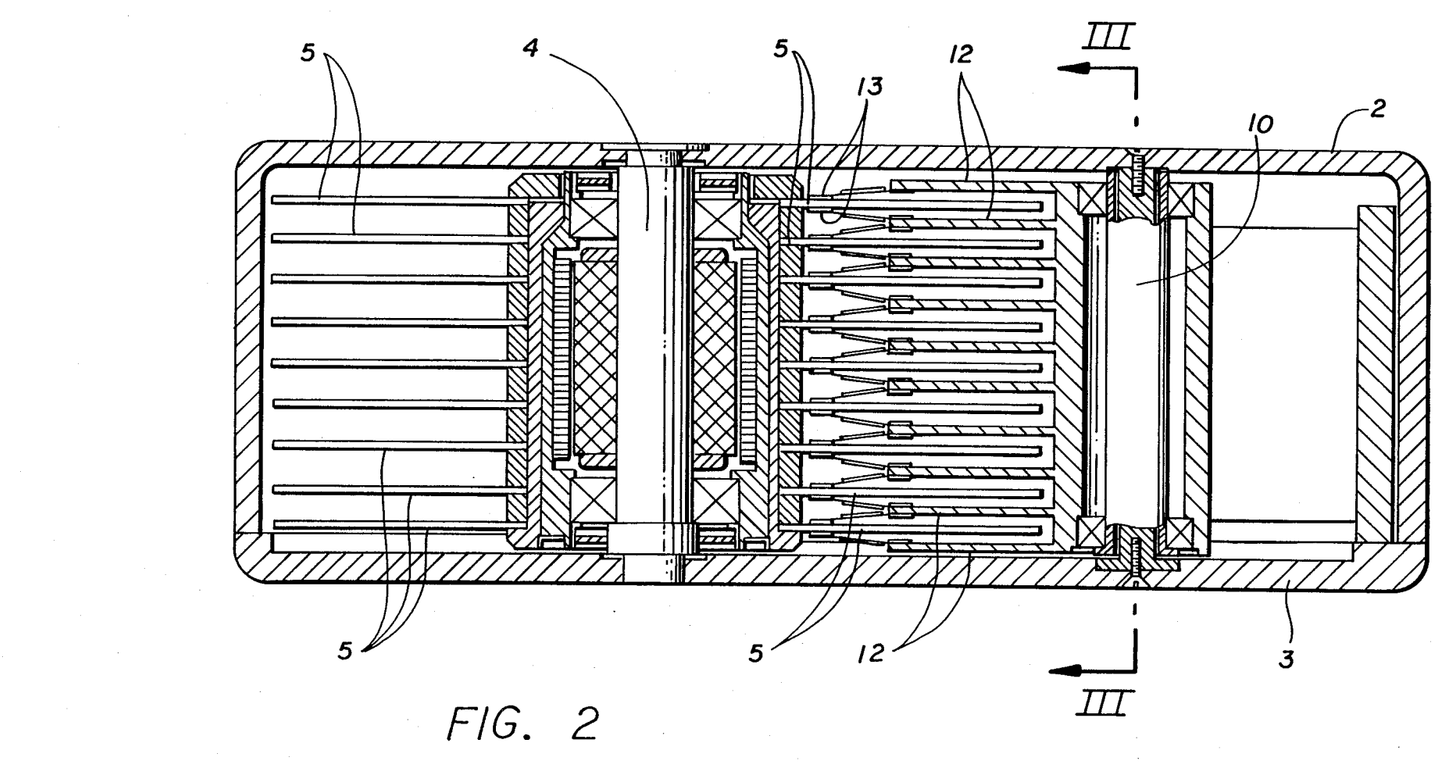
FIG. 2 is a schematic cross-sectional view of the hard disk drive of FIG. 1 with the cover assembled.
Figure 3:
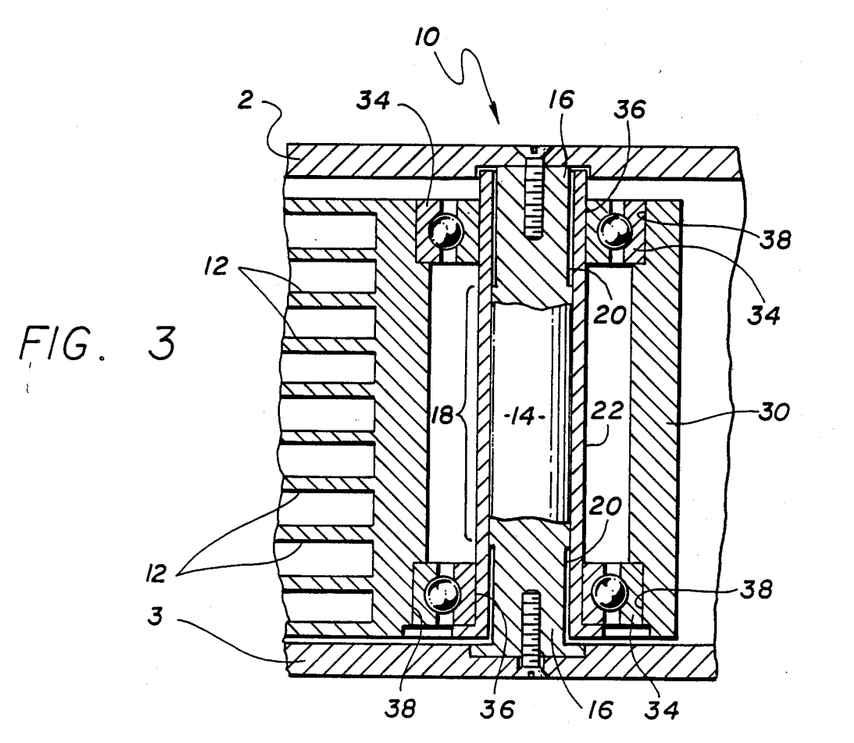
FIG. 3 is a more detailed cross-sectional view of the central hub of the head positioner of FIG. 2.

As mentioned above, this patent application is a continuation-in-part of U.S. Pat. No. 4,796,122, issued Jan. 3, 1989, which in turn is a continuation-in-part of U.S. Pat. No. 4,754,353, issued June 28, 1988. FIGS. 1 through 3 of the drawings of the present application, and the associated detailed description of these three figures of the drawings, correspond substantially to the drawings and related description as set forth in the above-noted, issued U.S. Patent. FIGS. 4 through 7 of the drawings of the present patent application, and the associated detailed description of these four figures of the drawings, corresponds substantially to the drawings and related description as set forth in the prior filed patent application noted above. FIGS. 8 through 13, however, and the related description which appears below, are new.

Referring now to the drawings, FIG. 1 illustrates the disk drive unit 1 of a type in keeping with the subject of this invention. Disk drive 1 typically comprises a rigid, cast housing 2 (FIG. 3) and a base plate 3, the illustration of FIG. 1 having the housing 2 removed from FIG. 1 to reveal the unit's contents.

The contents of the unit typically comprise a memory disk unit 4 operating in cooperation with a magnetic head positioning assembly 10.

Memory disk assembly 4 comprises a plurality of rigid storage disks 5 having magnetizable surfaces and which are stacked coaxially in a tandem, spaced relationship and rotated about a common axis by means of a central electric motor, including a central stator; and, relative to head positioner assembly 10, having a plurality of movable, interleaved head positioning arms 12, each having one or more magnetic heads 13 mounted thereon for reading and writing information magnetically on disks 5 as arms 12 are rotated interleaving into and out of disk storage unit 4 (see FIG. 2).

A feedback control loop or servo loop includes the arm positioner 10, and one surface of one of hard disks 5 which is dedicated to head-tracking and positional control. A common problem encountered in prior art drives is the mechanical resonances that occur within the servo loop which limit ultimate performance of the drive in terms of the time required to access information on disks 5, since the resonances have to be compensated for by a reduction of servo bandwidth.

One area that can cause resonance is associated with the stiffness of the bearings on which the head positioner assembly 10 pivots. Radial stiffness of these bearings is sensitive to the amount of axial load with which the assembly is preloaded. Various operational requirements impose a need to bond both inner and outer bearing races to the shaft and housing, respectively, to maintain preloads under shock, vibration and thermal loading. The amount of axial preload typically used is about 5 lbs., which is obtained with only 300 to 500 microinches of axial deflection.

Since the total deflection is so small, loads applied to the shaft during assembly or operation can cause the bearing to become partially unloaded. This condition will cause undesirable resonances to occur as a result of reduced radial stiffness.

It has been determined that a two-piece shaft can reduce the amount of deflection seen at the bearing races by providing an inner member which can deflect in response to external loads created by various mounting tolerance conditions, but which can transmit only part of these deflections to the outer sleeve which carries the bearings. Transmitted deflection is thus reduced by using only part of the inner shaft to hold the outer sleeve in place.

An arm positioner assembly 10 is shown in cross-sectional detail in FIG. 3. Arm positioner 10 includes a central assembly which includes a cylindrical aluminum shaft 14 having a length generally coextensive with the stack of disks 5, a long axis generally parallel to the hard disk common axis, a pair of ends 16, at least one of which is fixed against rotation, a central portion 18 of a given diameter, and a pair of end portions 20 which are reduced in diameter relative to central portion 18.

An aluminum (or other metallic material such as stainless steel) mounting sleeve 22 having a length generally coextensive with shaft 14 is thermally shrink fitted coaxially about shaft 14 along central portion 18 such that a diametral clearance exists between an inner diameter of mounting sleeve 22 and shaft end portions 20. In the exemplary preferred embodiment illustrated, which is directed to Winchester-type hard disk drives, shaft 14 and sleeve 22 have a length of about 2.4" overall, central portion 18 of shaft 14 has a length of about 1.2", and end portions 20 have lengths of about 0.60" each. Central portion 18 has an outer diameter of about 0.3760" and sleeve 22 is dimensioned such that there is a nominal diametral interference of about 0.0006" at room temperature between the two parts. End portions 20 are reduced in diameter relative to central portion 18 to provide a nominal diametral clearance between end portions 20 and the inner diameter of mounting sleeve 22 of about 0.0006" at room temperature. Thus, the interference between the shaft central portion 18 and the sleeve 22, and the clearance between the shaft end portions 20 and the sleeve 20, are a function of shaft length, shaft and sleeve diameter, shaft end portion fabrication, and shrink fitting of the sleeve 22 around the shaft 14. Sleeve 22 is normally assembled over shaft 14 by heating sleeve 22 and/or cooling shaft 14 to provide a minimum temperature difference between the two parts of about 300–350 degrees F. immediately prior to assembly, so that a clearance between the shaft 14 and sleeve 22 arises, facilitating their assembly.

Arm positioner assembly 10 further includes a hollow aluminum cylinder having an internal cylindrical surface and an outer cylindrical surface from which extend the substantially planar head-positioning arms 12. A "voice coil" 54 is associated with the magnetic head positioning assembly and operates in conjunction with fixed permanent magnets (see FIG. 4) through the agent of a variable direct current applied to the coil to permit the rotational position of head positioning assembly 30 to be controlled by means of the feedback control loop. In order to mount the head and arm-positioning cylinder or assembly 30 for rotational movement about the stator, a pair of annular, steel ballbearing assemblies 34 are provided at opposite ends of mounting sleeve 22 and the inner diameter of arm-positioning cylinder 30. Bearing assemblies 34 are bonded in place at their inner diameters in a region 36 inclusive of end portions 20 of shaft 14 and exclusive of the central portion 18 of shaft 14 by means of a single-component, anaerobic adhesive known as Loctite TM, which is also used to bond the outer cylindrical surface of bearings 34 to an inner cylindrical surface 38 of arm-positioning cylinder 30.

Figures 4, 5:
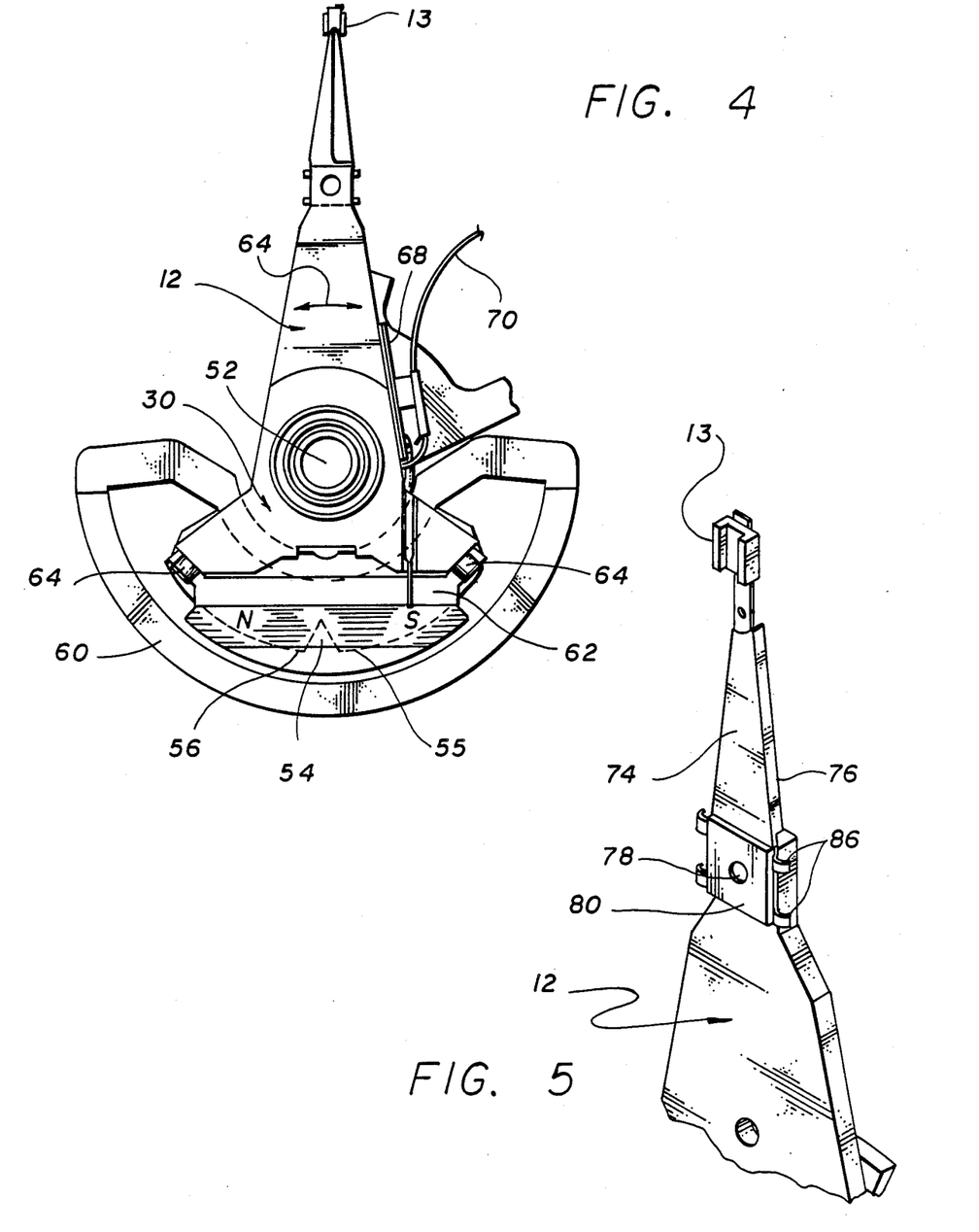
FIG. 4 is a top view of a head positioner assembly illustrating the principles of the present invention.
FIG. 5 is a perspective view of the outer end of one of the integral arms, together with one spring load beam mounting for a magnetic head.

Referring to FIG. 4 of the drawings, the central axis of rotation of the main body 30 of the head positioning assembly 10 is indicated at reference numeral 52. Reference numeral 52 corresponds to the center of the shaft 14, as shown in FIG. 3 of the drawings.

The arrangements for rotating the head positioner assembly include the coil 54 and the magnetic assembly, including the permanent magnets 56 and 55, which, with the magnetic return path 60, provide a complete magnetic circuit. The coil 54 is mounted on a plastic frame 62 which is secured to the rotating body 30 of the head positioner by screws 64. When direct current of one polarity is passed through the coil 54, it will rotate the head positioner assembly 30 as indicated by the arrows 64; and when the direct current flowing through the coil 54 is reversed, the head positioner will tend to move in the opposite direction. The foregoing mode of operation is, as broadly stated above, known in the field.

Signals from the magnetic heads 13 are connected to a small preamplifier circuit board 68, and the resultant amplified signals are coupled over a flat multicircuit cable 70 to the Winchester disk drive electronics.

Figure 7:
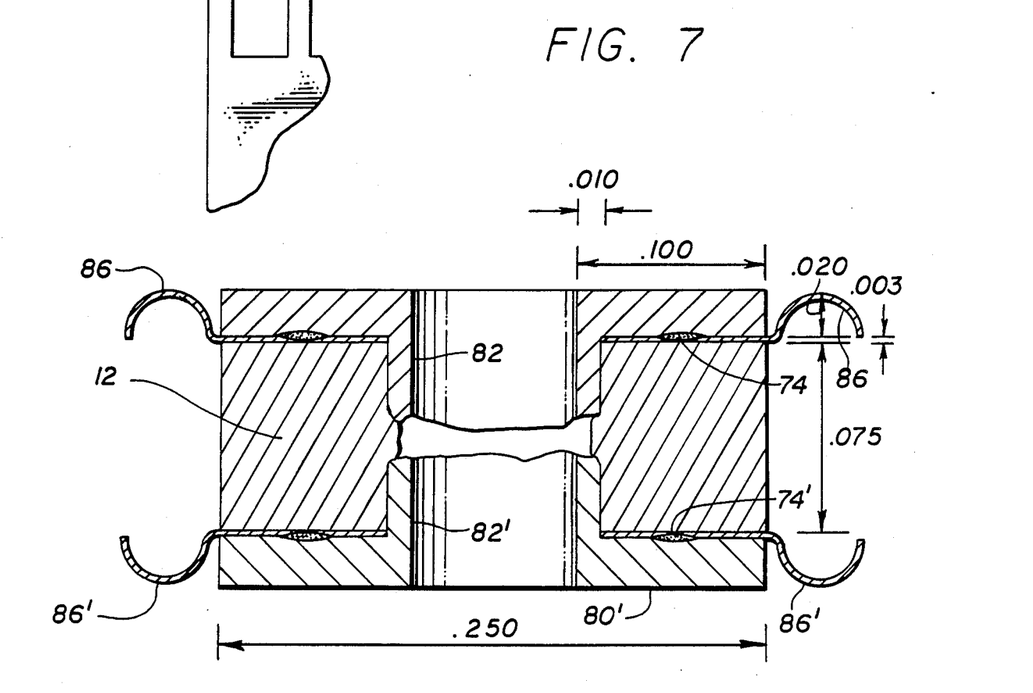
FIG. 7 is a cross-sectional view taken along plane VII—VII of FIG. 6.

The arrangements for mounting the head 13 to the outer end of the integral arm 12, are shown to advantage in FIGS. 5 and 7. More specifically, a springy flexible load beam 74, which is only about three thousandths of an inch thick, is employed for the mounting of the magnetic head 13. It may be noted that the load beam 74 has upturned edges 76 which provide increased rigidity to the load beam. The inner end of the load beam 74 and the outer end of the integral arm 12 both have matching holes, which are aligned with the opening 78 in the plate 80, which is employed to securely fasten the load beam 74 to the end of the integral arm 12. More specifically, and as shown to greater advantage in FIG. 7 of the drawings, the plate 80 may be approximately 0.020 inch thick, and may have a downwardly extending tublet 82 formed integrally therewith, and extending through the hole in the springy load beam 74.

Incidentally, the showing in FIG. 5 is that of a single magnetic head and load beam 74 secured to one of the integral arms 12, while FIG. 7 shows an arrangements wherein two load beams 74 and 74', are secured to a single integral arm 12. In addition, in FIG. 7, two plates 80 and 80', with inwardly extending tublets 82 and 82', may be shown. As noted above, the plates 80 and 80' are approximately twenty thousandths of a inch thick, while the arms 12 are approximately 0.075 inch thick. Also, as mentioned above, the load beams 74 are approximately 0.003 inch thick. As an initial step in the assembly, the plates 80 are welded to the load beams 74 by laser spot welds, or these two parts may be secured together in any other suitable manner, with the tublet 82 extending through the opening in the load beam 74. Then, all of the plates and load beams are assembled on all of the arms 12, with the tublets extending into the openings at the end of the arms 12, and the arms 12 are supported in a jig, to prevent permanent deflection thereof. A suitable swaging tool, or a hardened steel ball, such as a ball bearing, is then forced through the openings in all of the assemblies, so that the tublets 82 are swaged outwardly to make permanent engagement with the arms 12. With the arms 12 being formed of aluminum, and the tublets 82 being of stainless steel, the swaging action causes a permanent fixation of the plates 80 and the associated load beams 74 to the ends of the arms 12.

Incidentally, the precise configuration of the load beams 74 is established prior to securing to the plate 80, so that, when the disks 5, as shown in FIG. 2 are at rest, there will be a slight engagement of the magnetic heads 13 with the disks. Then, when the disks start to rotate, the entrained air, and the configuration of the heads 13, will cause the heads 13 to "fly" or to be spaced slightly away from the surface of the disks, so that there is a few millionths of an inch of space between the magnetic surface, and the associated magnetic head.

Figure 6:
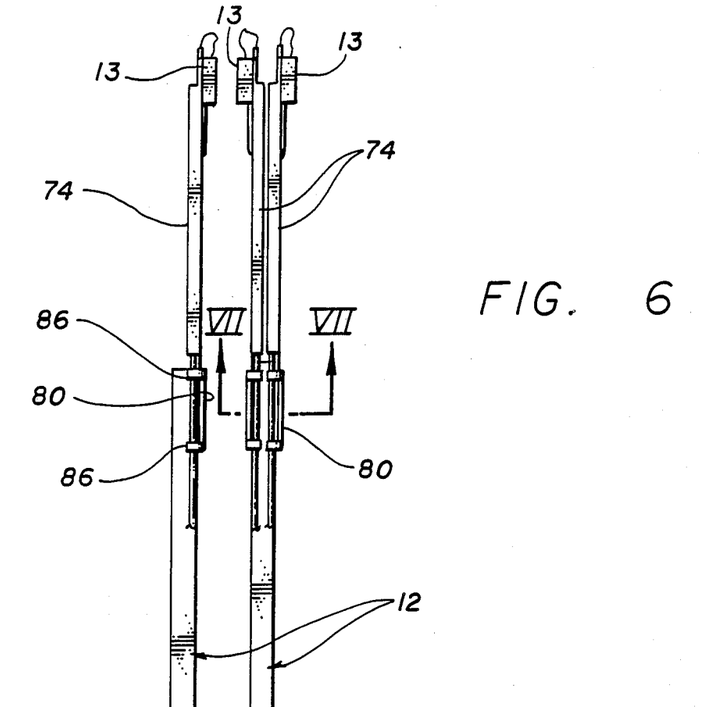
FIG. 6 is a side view of two of the arms of the head positioner, together with the associated spring load beams and associated magnetic heads.

FIG. 6 shows two of the arms 12, the associated magnetic heads 13, and three associated load beams 74. With eight disks and nine integral arms, sixteen heads and load beams are mounted with two on each intermediate arm, and one load beam and associated head on each of the end arms. Incidentally, the tabs 86 which are employed for guiding the conductors extending to the magnetic heads, are shown in FIG. 7, and at a greatly reduced scale in FIG. 6.

While precise dimensions are not critical, it is considered useful to mention the general order of the dimensions which are involved, for a 5¼ inch disk drive. More specifically, the distance from the axis 52 to the outer end of the arms 12 is approximately 2 inches, with each arm 12 having an extent from the main body of the rotating head positioner assembly 30 of about 1¼ inches. The length of the spring load beams which support the heads is approximately one inch from the end of the integral arms 12. Accordingly, the extent of the arms 12 from the axis to their outer ends is approximately twice the length of the spring load beams supporting the heads. It is noted in passing that the integral arms are spaced fairly close together, with nine arms having a total axial extent of less than two and one-eighth inches and the space between adjacent arms being in the order of three-sixteenths of an inch. With the limited available space, it is not easy to fixedly secure sixteen spring load beams to the nine integral and fixedly spaced arms. In accordance with the present invention, however, integral arms have been employed despite the mechanical design difficulties which were encountered, and these difficulties have been overcome, with the significantly improved disk drive performance being the result.

Figure 8:
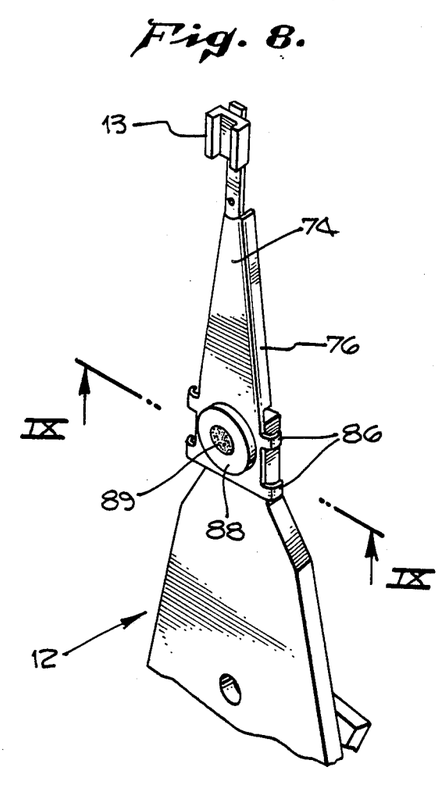
FIG. 8 is a perspective view of a head positioner assembly illustrating the principles of the present invention.

Referring to FIG. 8, it shows a single magnetic head 13 and load beam 74 secured to an integral arm 12 while FIG. 7 shows an arrangement wherein two load beams, 74 and 74', are secured to a single integral arm 12. As noted above in the detailed description, the integral arm 12 typically does have the arrangement of two load beams attached thereto as indicative of FIG. 7. FIG. 8 illustrates a single load beam 74 securely attached to integral arm 12 in order to illustrate specific unique aspects of the invention herein.

Unlike the attachment method for the magnetic head 13, load beam 74 and integral arm 12 combination illustrated in FIG. 5, the integral arm and load beam, and the magnetic head combination illustrated in FIG. 8 shows the use of a filler button 88 instead of plate 80 as shown in FIG. 5. The load beam 74 of FIGS. 8 and 9 herein has the associated upturned edges 76 which provides increased rigidity to the load beam 74, as well as securing tabs 86 which are integral to load beam 74 for positioning load beam 74 relative to integral ar 12 prior to the final securing of said load beam 74 to integral arm 12. Incidentally, the tabs 86 may be subsequently employed to guide leads from the heads to the head positioner assembly.

The filler metal button 88 is typically a metal or metal alloy which is compatible with the material of integral arm 12 for the purposes of metallurgically bonding the two components through the generation of a solid phase metallurgical bond joining the two components. With the arm 12 being formed of aluminum, the button 88 may also be of aluminum, although other metals and alloys may be used. It should be noted that load beam 74 has a hole in the same position as it did in the prior joining method of FIG. 5, where herein filler button or plate 88 covers that hole as shown. Additionally, filler button 88 has a section 89 which is plastically deformed into and through the hole in load beam 74 to intimately contact the corresponding parallel surface of integral arm 12 during and subsequent to bonding.

Figure 9:
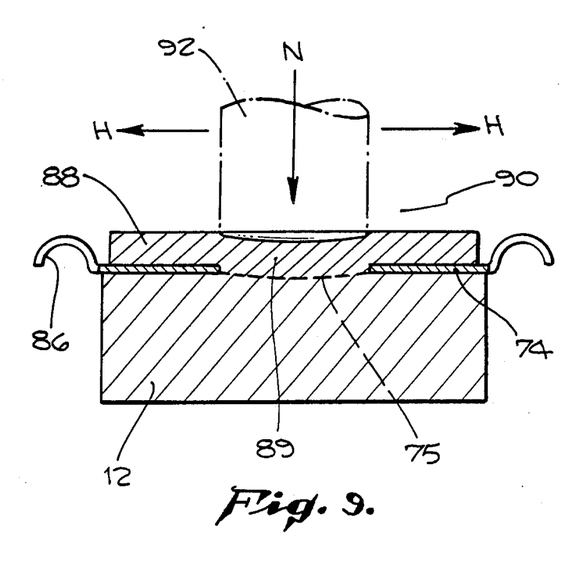
FIG. 9 is a cross-sectional view taken along the plane IX—IX of FIG. 8.
Figure 10:
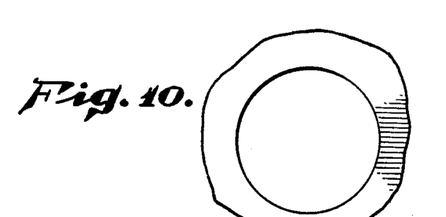
FIG. 10 illustrates a round hole in a load beam.

FIG. 9 shows the process used to create the solid faced metallurgical bond between filler button 88 and integral arm 12. The filler button 88 is placed over hole 75 in load beam 74 with load beam 74 already in positional contact with integral arm 12. A compressive force N contacts the filler button 88 by means of a cylindrical tip 92. The cylindrical tip 92 can be configured with an overall diameter which is approximately equal to the diameter of hole 75, or the tip 92 can have a taper so that the contact diameter of the tip is equal or less than that of hole 75. That configuration of tip enables the compressive force N to plastically deform the filler button 88 in order for it to flow through hole 75 and be in intimate contact with the surface of integral arm 12.

In the configuration of FIG. 9, the ultrasonic vibrations needed to obtain the required metallurgical bond are also transferred by means of tip 92. In FIG. 9, the letter H represents movement of the tip 92 and button 88 in the horizontal direction parallel to the mating surfaces of button 88 and arm 12. It should be noted that integral arm 12 is held in a stationary position while the bonding operation occurs. In production, two load beams may be bonded at once with dual ultrasonically energized tips and the stationary positioning of integral arm 12 by supporting it as close as possible to the outer end thereof without interfering with the assembly.

The solid phase bonding prevents the loosening of mechanical joints, and eliminates the necessity of flux or cleaning compounds during a joining of the components by brazing, soldering or welding where material would melt and solidify.

Figure 11:
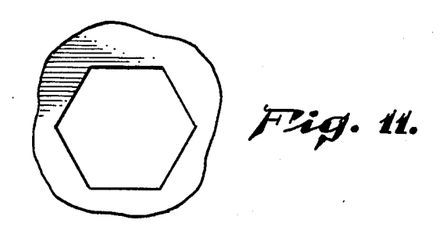
FIG. 11 illustrates a hexagonal weld hole in a load beam.
Figure 12:
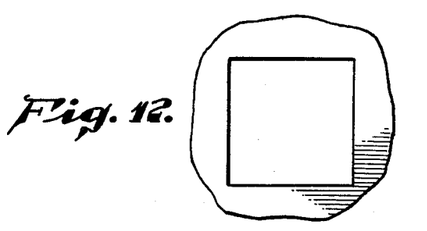
FIG. 12 illustrates a square hole in a load beam.
Figure 13:
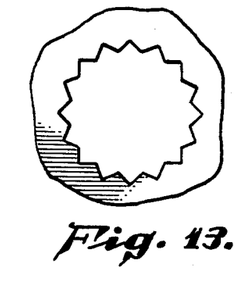
FIG. 13 illustrates a splined-type hole in a load beam.

Another aspect of the current invention is the minimizing of movement side-to-side by the load beam during use due to vibrations. Alternative load beam hole configurations to the round hole of FIG. 10 in load beam 74 are illustrated in FIGS. 11 through 13. The alternative configurations are contemplated for even greater resistance to side-to-side or angular movement of load beam 74 relative to arm 12 during operating of the disk storage system.

The tip utilized to generate both force and ultrasonic vibrations may be configured to either smaller diameter cylinders or shape consistent with the various shapes illustrated for the holes in FIGS. 11-13. Other configurations of holes and contact tips are possible and the figures are to illustrate some, but obviously not all, of the potential shapes of holes which would minimize any side-to-side movement of load beam 74.

While the description focuses on the creation of a metallurgical bond between metals, this does not exclude the option of utilizing the ultrasonic process to join the component in combination with non-metallic materials such as polymers and ceramics.

Successful ultrasonic welding has been accomplished, as shown in FIG. 9, using ultrasonic welding equipment from American Technology, Inc. of 75 Woodmont Road, Milford, Conn. 06460-2832. Successful results have been achieved using a 3,000 or 4,000 watt ultrasonic welder, operating at about 40 kilohertz.

Concerning the swaging technique of FIG. 7 and the ultrasonic welding technique of FIGS. 8 and 9, both techniques are advantageous in view of the intimate engagement of the securing plate or button with the arm 12, which holds the load beam rigidly to the arm 12. However, the swaging technique of FIG. 5 requires the formation of holes in the ends of the arms 12; and the cost of forming these holes by an EDM process is avoided by the use of the ultrasonic welding process. In addition, the ultrasonic welding process facilitates the replacement of individual heads and/or load beams. It also facilitates the removal of the head and/or load beam without damage to the head or load beam.

It may also be noted that, using the system of the present invention, a disk drive having a storage capacity of approximately 382 megabytes, and a MTBF (Mean Time Before Failure) of 30,000 hours, may be achieved within the industry "form factor" dimensions of 3.25 inches in height, 5.75 inches in width and 8.00 inches in depth.

In conclusion, it is to be understood that the specific construction as shown in the drawings, and as described in detail hereinabove, is illustrative of the principles of the present invention. Various modifications could be employed, to apply the principles of the invention to smaller or larger hard disk drives, for example. In addition, the spring load beams may be rigidly secured to the outer ends of the integral arms by other techniques. Thus, by way of example and not of limitation, instead of laser spot welding, the load beams may be secured to the retention plates by brazing or by suitable permanent adhesives. It is further noted that, instead of using a separate mounting plate, the end of each of the arms may be slotted to receive the load beams, and the mounting plate would then be formed of one portion of the end of each of the integral arms extending outwardly from the head positioning assembly. In addition, instead of tublet swaging, other known techniques may be employed for permanently and rigidly securing the spring load beams to the ends of the integral arms. Further, instead of using a composite sleeve for the center mount of the assembly, as shown in FIG. 3, a single solid shaft may be employed, with alternative constructional features and arrangements for mounting the shaft to the enclosing housing, being employed instead of for those shown and described in the prior patent application cited herein. Accordingly, the present invention is not limited to the precise configuration as shown in the drawings and as described hereinabove.

What is claimed is:

1. A Winchester type digital storage system comprising:
    a plurality of hard storage disks spaced apart from one another and mounted coaxially, said disks having magnetizable surfaces;

means for rotating said storage disks;
a plurality of magnet heads for reading and writing digital information on the surfaces of said disks;
head positioning means for mounting said heads in proximity to the surfaces of said disks, and for shifting the position of said heads across said disks, said head positioning means including individual spring load beam mounting means for each head, and a main rotable integral metal positioner body member, said integral metal positioner member having a central opening;
bearing means engaging said central opening for rotatably mounting said positioner member about a central axia;
said positioner body member including rigid integral arms extending outwardly to support said spring mounting means, said integral arms and said body member being a single homogeneous structure free of any joints;
the outward extent of said rigid arms from said central axis being substantially greater than the length of said spring mounting means; and
said load beam mounting means having holes at their inner ends overlying said arms, and being secured to the ends of said arms by mounting plates overlying said holes, with material from said mounting plates extending through the holes in said load beam means and into rigid bonding engagement with said arms.

2. A Winchester-type digital storage system as defined in claim 1 wherein said mounting plates are secured to the ends of said arms by ultrasonic welds.

3. A digital storage system as defined in claim 1 wherein holes in said load beams use non-circular, whereby rotation of said load beams relative to said arms is inhibited.

4. A Winchester type digital storage system comprising:
at least three hard storage disks spaced apart from one another and mounted coaxially, said disks having magnetizable surfaces;
means for rotating said storage disks;
a plurality of magnetic heads for reading and writing digital information on the upper and lower surfaces of each of said disks;
head positioning means for mounting said heads in proximity to the surfaces of said disks, and for shifting the position of said heads across said disks, said head positioning means including individual spring load beam mounting means for each head, and a main rotatable integral metal positioner body member, said integral metal positioner member having a central opening;
bearing means engaging said central opening for rotatably mounting said positioner member about a central axis;
said positioner boy member including at least four rigid integral arms extending outwardly to directly support said spring mounting means, said integral arms and said body member being a single homogeneous structure free of any joints;
said spring mounting means having holes in the inner ends thereof, and metal plate means extending through said hole in said spring mounting means and being ultrasonically welded to the ends of each of said integral mounting arms; and
said spring mounting means being welded to said plates.

5. A digital storage system as defined in claim 4 wherein holes in said load beams use non-circular, whereby rotation of said load beams relative to said arms is inhibited.

6. A digital storage system as defined in claim 4 wherein said metal plate means is formed of the same material as said arm.

7. A digital storage system as defined in claim 6 wherein said plate means and said arm are formed of aluminum.

8. A digital storage system as defined in claim 4 wherein said plate means and said arm form an ultrasonically welded solid phase metallurgical bond.

9. A digital storage system as defined in claim 4 wherein said plate means is formed of an aluminum alloy.

10. A digital storage system as defined in claim 4, said load beams include means for mechanically preventing movement of said load beams relative to said arms during ultrasonic welding.

11. A digital storage system as defined in claim 10 wherein said means for preventing movement is implemented by tabs on said load beams extending over the edges of said arms.

12. A digital storage system as defined in claim 5 wherein said hole is hexagonal.

13. A digital storage system as defined in claim 5 wherein said hole is square.

14. A digital storage system as defined in claim 5 wherein said hole has a square spline-type configuration.

15. A Winchester type digital storage system comprising:
at least three hard storage disks spaced apart from one another and mounted coaxially, said disks having magnetizable surfaces;
means for rotating said storage disks;
a plurality of magnetic heads for reading and writing digital information on the upper and lower surfaces of each of said disks;
head positioning means for mounting said heads in proximity to the surfaces of said disks, and for shifting the position of said heads across said disks, said head positioning means including individual spring load beam mounting means for each head;
said positioner body member including at least four arms extending outwardly to directly support said spring mounting means; and
said spring mounting means having holes in the inner ends thereof, and metal plate means extending through said hole in said spring mounting means and being ultrasonically welded to the ends of each of said integral mounting arms.

16. A digital storage system as defined in claim 15 wherein holes in said load beams use non-circular, whereby rotation of said load beams relative to said arms is inhibited.

17. A digital storage system as defined in claim 15 wherein said load beams include means for mechanically preventing movement of said load beams relative to said arms during ultrasonic welding.

18. A digital storage system as defined in claim 17 wherein said means for preventing movement is implemented by tabs on said load beams extending over the edges of said arms.

19. A digital storage system as defined in claim 15 wherein said plate means and said arm form an ultrasonically welded solid phase metallurgical bond.

* * * * *